Patented Oct. 11, 1927.

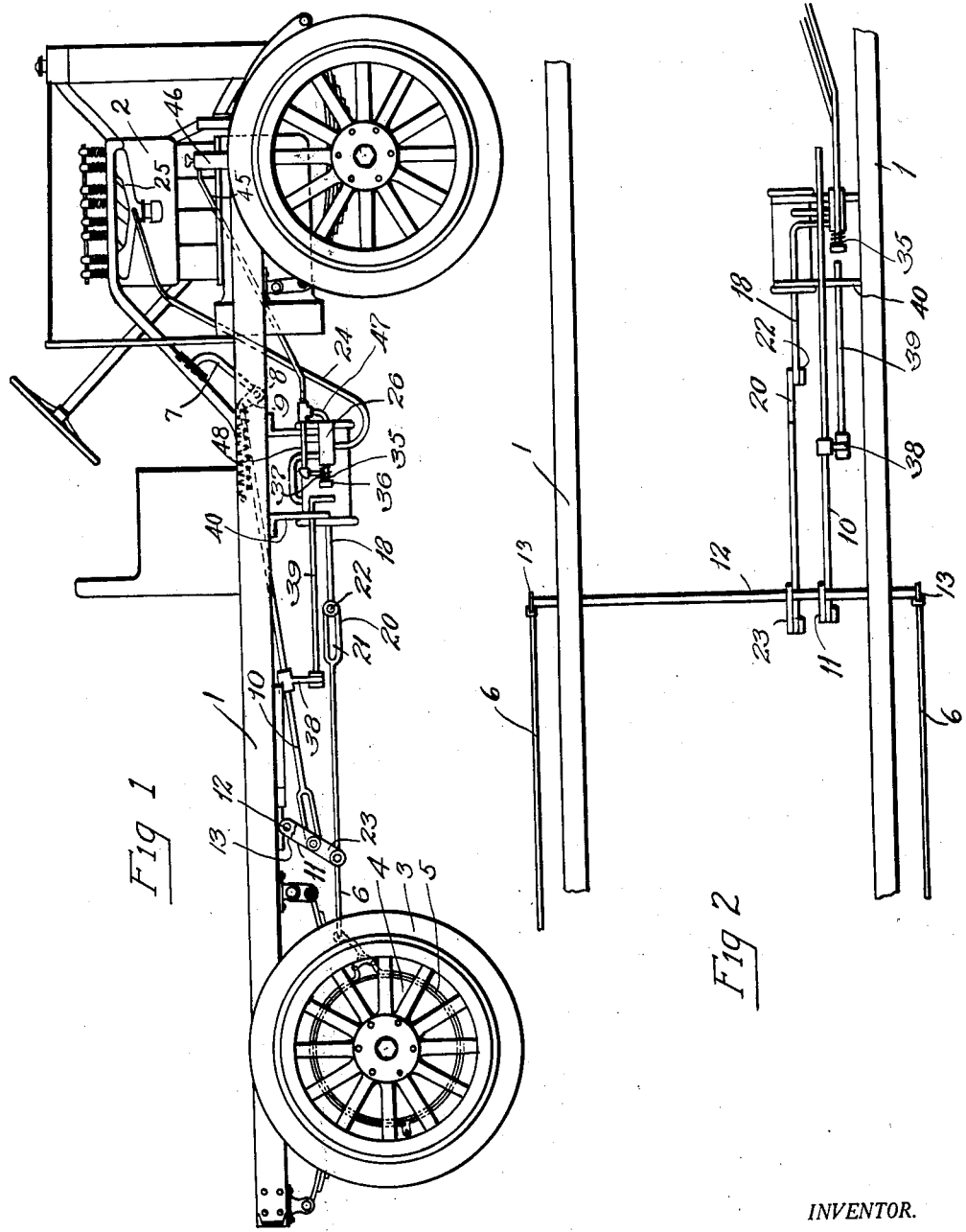

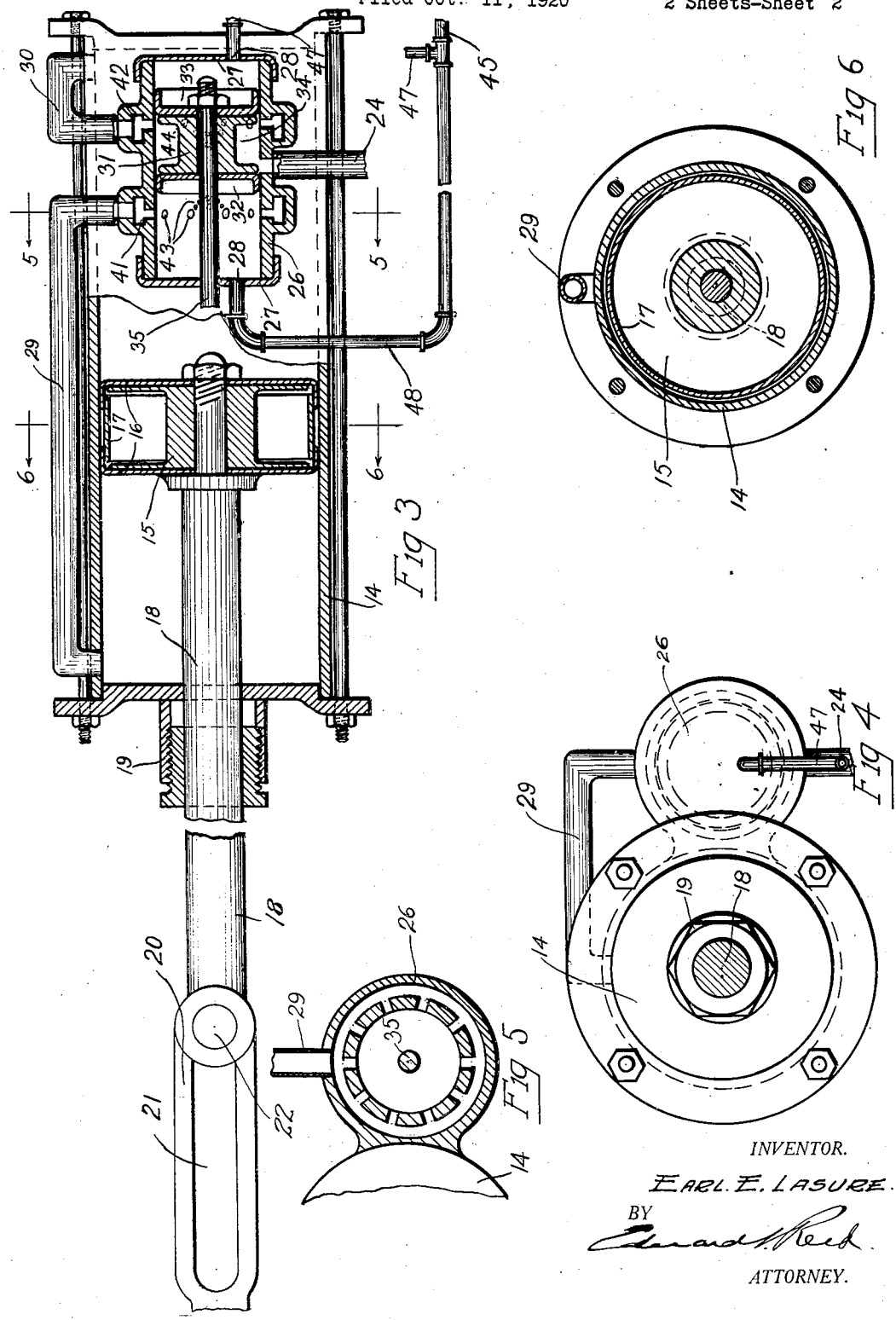

1,645,105

UNITED STATES PATENT OFFICE.

EARL E. LASURE, OF DAYTON, OHIO, ASSIGNOR TO WARREN C. LASURE, OF DAYTON, OHIO.

FLUID-OPERATED BRAKE.

Application filed October 11, 1920. Serial No. 416,211.

This invention relates to a fluid operated brake for motor vehicles and the like.

One object of the invention is to provide a simple highly efficient fluid operated brake which can be readily applied to motor vehicles, such for example as automobile trucks, and can be easily operated.

A further object of the invention is to provide such a fluid operated device, the fluid pressure in which will be controlled by the internal combustion engine which propels the vehicle.

A further object of the invention is to provide such a fluid operated device which may be operated by the usual brake operating mechanism and which will not interfere with the operation of the usual brake operating mechanism in the ordinary manner.

A further object of the invention is to provide, in connection with such a fluid operated device, means for automatically lubricating the interior parts thereof.

Further objects of the invention will appear as the mechanism is described in detail.

In the accompanying drawings Fig. 1 is a side elevation of the chassis of an automobile truck showing the invention applied thereto; Fig. 2 is a plan view of a portion of the frame of such a truck showing the invention applied thereto; Fig. 3 is a side elevation, partly in section, of the fluid operated device and its controlling valve; Fig. 4 is an end elevation of the same; Fig. 5 is a transverse sectional view taken through the controlling valve on the line 5—5 of Fig. 3; and Fig. 6 is a sectional view taken through the fluid pressure cylinder on the line 6—6 of Fig. 3.

In carrying out my invention I provide a fluid operated device, preferably in the form of an air cylinder with a piston mounted therein, which may be attached to the vehicle in any suitable manner and in any convenient location. This fluid operated device is connected with the brake for the vehicle in any suitable manner but preferably through the medium of the usual brake operating devices, this connection being such that it will not interfere with the operation of these usual devices in the ordinary manner. Preferably the arrangement is such that the ordinary brake operating lever, which is usually in the form of a foot lever, may be operated to actuate the brake independently of the fluid operated device within certain limitations, but when the movement of the operating lever exceeds this limitation then the fluid operated device will be actuated to cause it to operate the brake. I prefer to so construct the fluid operated device that it will be actuated by exhausting the air on one side of the piston rather than by the use of compressed air, and to this end the cylinder of the fluid pressure device is connected with a suitable suction apparatus, and if desired the suction in the intake manifold of an internal combustion engine may be utilized for this purpose. A controlling device is interposed between the suction apparatus and the cylinder to enable the suction apparatus to be connected with the cylinder on either side of the piston. The construction of the fluid operated device is such that when the suction apparatus is connected with the cylinder on one side of the piston the cylinder on the other side of the piston will be connected with the atmosphere, thus causing the piston to be moved by atmospheric pressure in a direction determined by the position of the controlling device.

In the present drawings I have shown the invention as applied to an automobile truck comprising a main frame 1 and an internal combustion engine 2 by means of which it is driven. The driving wheels 3 are provided with brake drums 4 about which extend brake bands 5 which are actuated by rods 6. The brake rods are operatively connected with a brake operating device, which is usually in the form of a lever and is here shown as a foot lever 7 which is secured to a rock shaft 8 having secured thereto an arm 9 which is connected by means of a rod 10 with an arm 11 rigidly secured to a rock shaft 12, journaled on the frame 1, and having secured thereto other rock arms 13 with which are connected the rods 6, the arrangement of the arms being such that downward pressure on the foot lever 7 will cause the brakes to be set. The rod 10 is connected with the arm 11 by a pin and slot connection so that the arm 11 and shaft 12 may have movement relative to the rod 10. It will be understood, however, that the invention can be applied to vehicles of various kinds and may be readily adapted to brakes of kinds other than that here shown, the present embodiment having been shown for the purpose of illustration only.

In that form of the device here shown the fluid operated device comprises a cylinder 14 which is air tight and has mounted therein a piston 15 which is preferably provided with oppositely facing cup leathers 16 which are held in their extended positions by means of an annular spring 17 arranged within the same. Connected with the piston 15 is a piston rod 18 which extends through a stuffing box 19 at one end of the cylinder and is adapted to be connected with the brake operating mechanism. As here shown, the connection is such that the foot lever can be operated through the greater portion of its movement without affecting the fluid operated device. To accomplish this the end portion of the piston rod 18 is provided with a stud or pin 22 which extends through a slot 21 in the adjacent end of a rod 20, the other end of which is pivotally connected with a rock arm 23 rigidly secured to the rock shaft 12, the length of the slot being such that the rock shaft 12 may be operated through a considerable portion of its movement independently of the piston rod, but when the piston is operated in a forward direction the piston rod will pick up the rod 20 and complete the movement of the shaft to tightly set the brake. The cylinder 14 is connected by means of a conduit 24 with a suction apparatus adapted to exhaust the air from one end or the other of the cylinder, and in the present construction, I have utilized the internal combustion engine 2 as the suction apparatus and to this end I have connected the conduit 24 with the intake manifold 25 of that engine.

A suitable controlling device is interposed between the suction apparatus and the cylinder and, in the present construction, this controlling device comprises a piston valve which consists of a cylindrical casing 26 closed at its ends by cylinder heads 27 which are provided with openings 28 leading to the atmosphere. The conduit 24 is preferably connected with the valve casing 26 at a point substantially midway between its ends, and the end portions of the casing, on the opposite sides of the point of connection of the conduit 24 are connected by conduits 29 and 30 with the rear and front portions, respectively, of the cylinder 14. Mounted within the valve casing is a valve piston 31 having cylindrical end portions which, in the present instance, comprise oppositely facing cup leathers 32 and 33, adapted to control the communication between the conduit 24 and the ports leading to the conduit 29 and the conduit 30. The valve piston 31 is provided between the cylindrical end portions thereof with an annular channel, or groove, 34, which is always in open communication with the suction conduit 24. The cylindrical portions of the valve piston are so arranged relatively one to the other that when the piston is in one position the conduit 30 will be connected through the channel 34 with the suction conduit 24 and the conduit 29 will be connected with the atmosphere through an opening in the end of the valve casing, and when the valve piston is in its other position the conduit 29 will be connected with the suction conduit 24 and the conduit 30 will be connected with the atmosphere through the opening in the other end of the valve casing. When the valve piston is in its forward position, as shown in Fig. 3, the suction conduit 24 will be connected through the conduit 30 with the front end of the cylinder 14 and the rear end of the cylinder 14 will be connected through the conduit 29 with the rear end of the valve casing 26 which, as has been stated, is in open communication with the atmosphere through the port 28. Consequently, the suction in the intake manifold is exerted upon the forward end of the cylinder 14 and tends to exhaust the air therein and to produce a vacuum. Inasmuch as the opposite end of the cylinder is in communication with the atmosphere the piston will be forced toward the forward end of the cylinder, thereby actuating the brake setting mechanism to set the brakes. When the valve piston is moved toward the opposite end of its casing the rear end of the cylinder is connected with the suction conduit 24 and the forward end of the cylinder is connected with the atmosphere, thus causing the piston to be moved to its rear, or idle, position and causing the brakes to be released in the usual manner.

The valve piston 31 may be operated in any suitable manner. As here shown, it is provided with a valve stem 35 extending through the rear end of the valve casing and provided with a head 36. A spring 37 coiled about the stem 35 between the head and the end of the casing tends to hold the valve piston normally in its rearmost position. The valve may be actuated in any suitable manner to reverse the connections between the cylinder and the suction apparatus but, as has been above stated, I prefer to accomplish this by the operation of the foot lever 7 and to this end I have secured to the rock shaft 12 an arm 38 with which is connected a rod 39 slidably mounted in a suitable guide 40 on the valve casing and arranged to engage the head 36 of the valve stem 35. The arrangement of the rod 39 with relation to the valve stem 35 is such that the rod will not engage the head of the stem until the lever 7 has been moved through a considerable part of its movement, thus enabling this lever to be utilized to operate the brakes when a relatively light braking action is required, but when it is desired to fully set the brakes the lever is moved a further distance and the rod 39 engages the valve stem and shifts the valve piston, thus connecting the forward end of the cylinder with the suction apparatus. The valve will be shifted before the lever 7 completes its downward movement and, consequently, by regulating the amount of movement imparted to the lever 7 the amount of movement imparted to the valve piston can be regulated and thereby the amount of pressure exerted upon the brakes may be varied, the movement of the arm 23 relative to the rod 10 permitting the brakes to be actuated by the piston 15 without transmitting movement to the valve.

I also prefer to connect the conduits 29 and 30 with the valve casing in such a manner that they will be opened and closed gradually, thereby avoiding the too sudden operation of the brakes and also enabling the amount of pressure exerted upon the brakes to be more easily regulated. For this purpose I have provided the valve casing with two circumferential channels 41 and 42 which are connected respectively with the conduits 29 and 30 and which communicate respectively with the interior of the valve casing 26 by means of series of ports 43 and 44, the ports of each series being spaced such distances from the respective ends of the valve casing that they will be uncovered or covered successively by the cylindrical portions of the valve piston, thus gradually increasing the flow of air to or from the casing. These ports are also so arranged that when the valve piston has been moved to its forward position the ports 43 will communicate with the rear end of the casing while the ports 44 communicate with the annular channel 34 of the valve piston, and when the valve has been moved to its rearward position the ports 44 will communicate with the forward end of the valve casing and the ports 43 will communicate with the circumferential channel of the valve piston.

The operation of the device will be readily understood from the foregoing description of the several parts thereof and it will be apparent that I have provided a very simple, easily controlled, fluid pressure brake operating device which can be readily applied to automobiles or other vehicles of various kinds; and which is controlled by the usual brake controlling device and which will not interfere with the ordinary operation of that device. Further, it will be apparent that I have provided such a device in which the fluid pressure is controlled by the engine which propels the vehicle, thereby avoiding the necessity of providing air compressors, or other auxiliary devices to control the air pressure. Inasmuch as the throttle valve of the engine is usually closed when the brakes are to be fully set the suction on the fluid pressure cylinder does not affect the operation of the engine, but even if the brake is operated while the throttle valve is open the efficiency of the engine will not be appreciably affected because as soon as the small amount of air in the cylinder on one side of the piston is exhausted the conduit 24 is to all intents and purposes closed. Consequently, when either end of the cylinder 14 is connected with the conduit 24 air will be drawn through the conduit 24 only until the air in that end of the cylinder has been exhausted and then, because of the exhaustion of the air, the conduit is, so far as the intake manifold is concerned, closed and the suction on the carburetor is restored to normal.

It is also desirable that means should be provided for lubricating the pistons in the main cylinder and in the valve casing, and, in the present instance, I have provided means for automatically lubricating these parts. To accomplish this I have connected the opposite ends of the valve casing with the atmosphere through the crank case of the engine, instead of connecting the same directly with the atmosphere. As here shown, a conduit 45 is connected with the filler tube 46 which leads to and is in open communication with the crank case of the engine, and this conduit, is provided with two branches 47 and 48 which communicate with the opposite ends of the valve casing through the respective openings 28. Consequently, when the piston in the main cylinder 14 moves in one direction it will draw air into the cylinder behind it and this air will come from the crank case, through the conduit 45 and valve casing, and will, consequently, be charged with oily vapors from the crank case. These vapors coming in contact with the interiors of the valve casing and of the main cylinder will adequately lubricate these parts. Further, the air thus entering the main cylinder is drawn therefrom through the conduit 24 into the intake manifold and hence comes in contact with the intake valve and serves to lubricate the stems of these valves.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. The combination with a vehicle and a brake therefor, of a fluid operated device comprising a cylinder, a piston mounted therein and connected with said brake, a valve casing, conduits connecting said valve casing directly with said cylinder on opposite sides of said piston, suction apparatus connected with said valve casing, and a valve member movably mounted in said valve casing to connect said suction apparatus with either of said conduits, said casing having means cooperating with said valve member to gradually establish the connection between said suction apparatus and said cylinder.

2. The combination with a vehicle and a brake therefor, of a fluid operated device comprising a cylinder, a piston mounted therein and connected with said brake, a valve casing, conduits communicating with said valve casing and leading to said cylinder on opposite sides of said piston, a suction apparatus connected with said valve casing, and a valve member movably mounted in said valve casing and having a passageway arranged to communicate with said suction apparatus in all positions of said valve member and to alternately communicate with said conduits when movement is imparted to said valve.

3. The combination with a vehicle and a brake therefor, of a fluid operated device comprising a cylinder, a piston mounted in said cylinder and connected with said brake, a valve casing, conduits communicating with said valve casing on opposite sides of the center thereof and leading to said cylinder on opposite sides of said piston, a suction apparatus connected with said casing between the points of connection of said conduits therewith, a valve piston slidably mounted within said casing and having a circumferential channel arranged to communicate with said suction apparatus in all positions of said valve piston and arranged to communicate with one of said conduits when said valve is in one position and with the other of said conduits when said valve is in another position, said casing having air inlets in the end walls thereof and said valve piston being so arranged that when one of said conduits is in communication with the circumferential channel of said piston, the other of said conduits will be in communication with the end portion of said casing.

4. The combination with a vehicle and a brake therefor, of a fluid operated device comprising a cylinder, a piston mounted in said cylinder and connected with said brake, a valve casing having two series of circumferentially arranged ports, each series having ports spaced different distances from the respective ends of said casing, said casing also having air inlets at the ends thereof, conduits connected with the respective series of ports and leading to said cylinder on opposite sides of said piston, a suction apparatus connected with said valve casing, a valve member mounted in said casing for movement lengthwise thereof and having a passageway normally communicating with said suction apparatus and arranged to communicate with one or the other of said series of ports according to the position of said valve member.

5. The combination with a vehicle, a brake therefor, and a device for actuating said brake, of a fluid operated device connected with said brake to actuate the same, means for controlling the operation of said fluid operated device, and a connection between said controlling device and the first mentioned brake actuating device, said connection being of such a character as to permit of a limited operation of said first mentioned brake operating device without causing the operation of said fluid operated device.

6. The combination with a vehicle, a brake therefor, and a device for actuating said brake, of a fluid operated device connected with said brake to actuate the same, said connection being of such a character that said brake may be operated to a limited extent independently of said fluid operated device, means for controlling the operation of said fluid operated device, and a connection between said controlling means and said brake actuating device, said connection being of such a character that the first movement of said brake operating device will actuate the brake and the further movement thereof will cause the operation of said fluid operated device.

7. The combination with a vehicle, a brake therefor, and a device for actuating said brake, of a fluid operated device operatively connected with said brake, a suction apparatus connected with said fluid operated device, means for controlling the connection between said suction device and said fluid operated device, and an operative connection between said brake actuating device and said controlling means, said connection being of such a character that said controlling device will not be operated until the brake actuating device has partially completed its movement.

8. In combination with a vehicle, a brake therefor, and a device for actuating said brake, of a fluid operated device operatively connected with said brake, a valve to control said fluid operated device comprising a casing, a piston mounted in said casing and having a stem, an actuating member for said valve supported normally out of contact with said stem but movable into operative engagement therewith, and means controlled by said brake actuating device to impart movement to said actuating member.

9. In combination with a vehicle, a brake therefor, and a device for actuating said brake comprising a rock shaft, of a fluid operated device operatively connected with said brake, a valve to control said fluid operated device comprising a casing, a piston mounted in said casing and having a stem, a rod supported normally out of contact with said stem but mounted for lengthwise movement into operative engagement therewith, and an operative connection between said rod and said rock shaft.

10. The combination with a vehicle, an internal combustion engine mounted thereon, driving wheels therefor, a brake applied to said driving wheels, a rod connected with said brake, a rock shaft, an arm secured to said rock shaft and connected with said brake actuating rod, and a second arm secured to said rock shaft and connected with a lever, of a fluid operated device carried by said vehicle and operatively connected with said brake actuating rod in such a manner as to permit said rod to have movement relatively thereto, a connection between said fluid operated device and the intake manifold of said engine, a valve to control said connection, another arm connected with said rock shaft, and a rod connected with said last mentioned arm and arranged to actuate said valve.

11. The combination with a vehicle, a brake therefor, and an internal combustion engine mounted thereon, of a cylinder, a piston mounted in said cylinder and connected with said brake, a valve casing, conduits connecting said valve casing with said cylinder on opposite sides of said piston, a connection between said valve casing and the intake manifold of said engine to create a suction in said cylinder, a valve piston movably mounted in said valve casing to connect said intake manifold with either of said conduits, and means for connecting said valve casing on both sides of said piston with the crank case of said engine.

In testimony whereof, I affix my signature hereto.

EARL E. LASURE.